(12) United States Patent
Schmidt et al.

(10) Patent No.: US 11,988,548 B2
(45) Date of Patent: May 21, 2024

(54) METHOD FOR IDENTIFYING A CHANGE IN THE OPERATING BEHAVIOR OF A CRANKSHAFT DRIVE OF A MOTOR VEHICLE

(71) Applicant: MAN Truck & Bus SE, Munich (DE)

(72) Inventors: Christopher Schmidt, Fürth (DE); Roman Suchanek, Schwabach (DE)

(73) Assignee: Man Truck & Bus SE, Munich (DE)

( * ) Notice: Subject to any disclaimer, the term of this patent is extended or adjusted under 35 U.S.C. 154(b) by 653 days.

(21) Appl. No.: 17/264,696

(22) PCT Filed: Jul. 25, 2019

(86) PCT No.: PCT/EP2019/070087
§ 371 (c)(1),
(2) Date: Jan. 29, 2021

(87) PCT Pub. No.: WO2020/025452
PCT Pub. Date: Feb. 6, 2020

(65) Prior Publication Data
US 2021/0317796 A1    Oct. 14, 2021

(30) Foreign Application Priority Data

Jul. 30, 2018   (DE) .......................... 102018118320.8

(51) Int. Cl.
*G01H 11/02* (2006.01)
*F02D 41/22* (2006.01)
(Continued)

(52) U.S. Cl.
CPC ............. *G01H 11/02* (2013.01); *F16F 15/10* (2013.01); *G01M 13/028* (2013.01); (Continued)

(58) Field of Classification Search
CPC ...... G01H 11/02; F16F 15/10; G01M 13/028; G01M 15/046; G01M 15/12; G01M 13/021; F02D 41/009; F02D 41/22
See application file for complete search history.

(56) References Cited

U.S. PATENT DOCUMENTS

| 5,278,760 A | 1/1994 | Ribbens et al. |
| 2007/0079785 A1 | 4/2007 | Moller et al. |
| 2013/0197740 A1 | 8/2013 | Hagel et al. |

FOREIGN PATENT DOCUMENTS

| CN | 102105774 A | 6/2011 |
| CN | 102809422 A | 12/2012 |

(Continued)

OTHER PUBLICATIONS

DE-4227104-A1 (William et al.) (Mar. 18, 1993) (Machine Translation) (Year: 1993).*

(Continued)

*Primary Examiner* — Mahmoud Gimie
(74) *Attorney, Agent, or Firm* — Weber Rosselli & Cannon LLP

(57) ABSTRACT

The disclosure relates to a method for identifying a change in the operating behavior of a crankshaft drive of a motor vehicle. In particular, the disclosure relates to a method for identifying error states of a torsional-vibration damper in the crankshaft drive, such as a jamming or slipping of a secondary mass of the torsional-vibration damper. The crankshaft drive comprises a crankshaft, a pulse generator that rotates when the crankshaft is in operation and a fixed sensor device, which generates a rotational speed signal N as a function of the rotational speed of the pulse generator. The method comprises the following steps: detecting a current rotational speed signal $N_{akt}$ of the sensor device during operation of the crankshaft drive; filtering the current rotational speed signal $N_{akt}$ using a bandpass filter that has at (Continued)

least one first passband range D1 comprising a first center frequency f1; comparing the filtered current rotational speed signal $N_{akt}$ with a reference signal $N_{ref}$ stored in a memory; and identifying a change in the operating behavior of the crankshaft drive on the basis of the comparison of the filtered current rotational speed signal $N_{akt}$ with the reference signal $N_{ref}$. The disclosure further relates to a vehicle, such as a commercial vehicle, having a control device which is configured to perform a method of this kind.

21 Claims, 5 Drawing Sheets

(51) Int. Cl.
  *F16F 15/10*   (2006.01)
  *G01M 13/028*   (2019.01)
  *G01M 15/04*   (2006.01)
  *G01M 15/12*   (2006.01)
  *F02D 41/00*   (2006.01)
  *G01M 13/021*   (2019.01)

(52) U.S. Cl.
  CPC .......... *G01M 15/046* (2013.01); *G01M 15/12* (2013.01); *F02D 41/009* (2013.01); *F02D 41/22* (2013.01); *G01M 13/021* (2013.01)

(56) References Cited

FOREIGN PATENT DOCUMENTS

| | | | |
|---|---|---|---|
| DE | 4227104 A1 * | 3/1993 | ......... F02D 41/1498 |
| DE | 102008032708 A1 | 1/2010 | |
| DE | 102010041889 A1 | 4/2012 | |
| WO | WO-2011138999 A1 * | 11/2011 | ......... F02D 41/1498 |
| WO | 2016000733 A1 | 1/2016 | |
| WO | 2018103780 A1 | 6/2018 | |

OTHER PUBLICATIONS

International Preliminary Report on Patentability issued in PCT/EP2019/070087 dated Feb. 11, 2021, with English translation, 29 pages.
International Search Report and Written Opinion issued in PCT/EP2019/070087 dated Nov. 6, 2019, with English translation.
Chinese Office Action issued in Chinese Patent Application No. 201980050709.3 dated Feb. 25, 2023. English translation not available.
Notification of the Second Office Action issued in Chinese Application No. 201110026652.9 dated Oct. 21, 2023 with English translation.

* cited by examiner

METHOD FOR IDENTIFYING A CHANGE IN THE OPERATING BEHAVIOR OF A CRANKSHAFT DRIVE OF A MOTOR VEHICLE

FIELD

The disclosure relates to a method for detecting a change in the operating behavior of a crankshaft drive of a motor vehicle, such as a commercial vehicle. In particular, the disclosure relates to a method for detecting fault conditions of a torsional vibration damper located in the crankshaft drive, such as a jamming or slipping of a secondary mass of the torsional vibration damper. Moreover, the disclosure relates to a vehicle, such as a commercial vehicle, comprising a control unit, which is configured for carrying out such a method.

BACKGROUND

During the operation of the internal combustion engine in the motor vehicle, the crankshaft drive, in particular the crankshaft as well as the torsional vibration damper, which is often present, are subjected to high bending and torsional loads. In addition, the components and bearings are stressed by torsional vibrations, which result from the continuous, pulsating accelerations and decelerations of the rotary motion of the crankshaft drive. In order to prevent a breakdown of the vehicle due to an engine failure, it is desirable to detect wear of the crankshaft drive, in particular wear of the torsional vibration damper, as early as possible.

It is known from the related art to monitor the crankshaft drive and, in particular, the torsional vibration damper in the drive train with the aid of an order analysis of the rotational speed signal. For example, unexamined patent application DE 10 2010 041 889 A1 describes a method therefor, in which the rotational speed signal is initially transformed into the frequency domain and, thereafter, the resultant signal amplitudes of different engine orders are compared to reference amplitude values. On the basis of the amplitude difference of the two signals, possible fault conditions of the torsional vibration damper are then inferred. The disadvantage of this method, however, is that the detected measuring signals must be post-worked, in a complex manner, as part of the Fourier analysis. This requires sensor hardware having sufficient computing power, which therefore increases its costs.

SUMMARY

The problem addressed by the disclosure is that of providing a method, which has been improved as compared to the related art, in order to detect a change in the operating behavior of a crankshaft drive of a motor vehicle. In particular, the problem addressed by the disclosure is that of providing a method for monitoring the crankshaft drive, which is simpler to implement and is more cost-effective, requires fewer arithmetic operations and, in addition, is able to identify the exact type of a fault condition.

These problems are solved by a method having features that are explained in greater detail in the following description with partial reference to the figures.

The disclosure is based on the idea, which is known per se, of monitoring the state of the crankshaft drive on the basis of its vibration behavior, which is dependent on the current geometry and material composition. For this purpose, the rotational speed signal is investigated with respect to the presence of vibration components having a high frequency, which are superimposed on the actual signal. In contrast to the previous methods, which are mostly based on a complex Fourier analysis of the rotational speed signal, the basic concept of the disclosure is that of filtering only the frequency ranges out of the rotational speed signal with the aid of a bandpass filter, in which changes occur in the resonance behavior if a fault condition of the crankshaft drive is present. As a result, on the one hand, the data volume to be processed is reduced; on the other hand, the bandpass filtering is technically considerably simpler to implement than a complete Fourier analysis of the signal. Moreover, since the resonance behavior of the crankshaft drive is characteristic for each possible fault condition, the precise type of the fault condition can also be ascertained from the resultant signal pattern due to a monitoring of multiple frequency ranges.

According to a general aspect of the disclosure, a method is provided for detecting a change in the operating behavior of a crankshaft drive of a motor vehicle, such as a commercial vehicle. In particular, the crankshaft drive can also include a torsional vibration damper. Operating behavior, which encompasses, in particular, the rotational speed-dependent vibration behavior, position behavior, and resonance behavior of a crankshaft drive comprising, for example, a crankshaft, bearings, connecting rods, pistons, rings, bolts, vibration dampers, and flywheels, can be understood to mean the manner in which a crankshaft drive operates under predefined conditions (for example, rotational speed). Moreover, the crankshaft drive comprises a crankshaft, a pulse generator rotating during the operation of the crankshaft, and a fixed sensor unit, which generates a rotational speed signal N depending on the rotational speed of the pulse generator. Additionally, or alternatively, the fixed sensor unit can also generate an angular velocity signal $\omega$, which is dependent on the angular velocity of the pulse generator. The rotational speed signal and the angular velocity signal differ merely by the factor $2\pi$ and are related via the relationship $\omega=2\pi N$.

Pulse generators and appropriate sensor units for detecting the rotary motion of the pulse generators are known from the related art. For example, magnetic sensors, including inductive, oscillatory-inductive, magneto-resistive, eddy current sensors and/or Hall effect sensors can be utilized for the claimed method. All are based on a contactless detection of a change of the magnetic flux at the location of the sensor unit due to the movement of the pulse generator. Moreover, optical sensors can also be utilized, which measure the intensity, phase, and/or polarization of the light incident on the sensor unit and modulated by the rotation of the pulse generator. The expression "light" is to be understood to mean any type of electromagnetic radiation.

The pulse generator has the task of affecting the sensor unit during the operation of the crankshaft drive and can be designed, for example, as a gear wheel, transmitter wheel, code or perforated disk. However, any other further structures can also be used, which rotate in a fixed relationship with respect to the crankshaft and comprise, at least in some areas, an, in particular circumferential-side, area in the form of a hole, a projection, a groove, or any other area having a different magnetization, reflectivity, and/or transmissivity. If these structures are guided past the sensor unit, the speed at which the pulse generator rotates can be ascertained from the change of the magnetic flux and/or the spatial light distribution per unit of time at the location of the sensor unit. This rotational speed and/or angular velocity signal generated by the sensor units forms the basis for the claimed method, wherein only the method steps for the rotational speed signal N are described in the following, for the sake of clarity. The described teaching can therefore also be transferred to the angular velocity signal ω, however.

According to the disclosure, the method includes the following steps:

During the operation of the crankshaft drive, a current rotational speed signal $N_{akt}$ of the sensor unit is detected, for example, at a high scanning rate. This current rotational speed signal $N_{akt}$ is filtered with the aid of a bandpass filter, which has at least one first passband range $D_1$ comprising a first center frequency $f_1$. In other words, the bandpass filter allows only the signal component of the current rotational speed signal $N_{akt}$ to pass that is situated in the frequency band of the passband range $D_1$ characterized by two cutoff frequencies, for example, $D_1$=120 Hz to 130 Hz. The frequency ranges above and below the passband range, i.e., in the previous example, below 120 Hz and above 130 Hz, are blocked or considerably attenuated. The expression "center frequency" can be understood to mean, as usual, the geometric mean of the lower and the upper cutoff frequencies of the passband range (i.e., in the preceding example, $f_1$=125 Hz). The filtered current rotational speed signal $N_{akt}$ is then compared to a reference signal $N_{ref}$ stored in a memory. Based on the comparison of the filtered current rotational speed signal $N_{akt}$ with the reference signal $N_{ref}$, a change in the operating behavior of the crankshaft drive is detected. The reference signal $N_{ref}$ can be a vehicle-specified or a vehicle-unspecified reference signal. This means, the reference signal can have been determined precisely for the vehicle, in which the crankshaft drive was installed, or for another reference vehicle, although including an essentially identical crankshaft drive. In addition, $N_{akt}$ as well as $N_{ref}$ can include multiple signal values of an information-carrying variable. The advantage of the disclosure as compared to the Fourier-based methods from the related art is that, instead of the complete frequency range, which also contains a range of non-relevant information, only the frequency range is monitored, in a targeted manner, in which changes in the rotational speed signal occur in the case of a fault condition. Therefore, a complex Fourier analysis of the rotational speed signal is dispensed with and, additionally, the data volume to be processed is reduced.

Although the method is described, in a targeted manner, for detecting changes in the operating behavior of a crankshaft drive, the principle can also be utilized for detecting changes in the operating behavior of the camshaft, the drive shaft, or any other shaft when the pulse generator is appropriately coupled to the camshaft, the drive shaft, or any other shaft. The particular advantage with respect to monitoring the crankshaft drive is that such an arrangement of the individual components, i.e., pulse generators and sensor unit, for measuring rotational speed is already present at the crankshaft drive for most motor vehicles.

According to one embodiment of the disclosure, in the step of detecting a change in the operating behavior of the crankshaft drive, a fault condition of a torsional vibration damper located in the crankshaft drive is detected in a targeted manner. If the crankshaft drive comprises a component of this type for reducing undesirable torsional vibrations of the crankshaft, faulty operating states of this component, for example, a jamming or slipping of a secondary mass of the torsional vibration damper, can be detected with the claimed method. Such fault conditions occur, first and foremost, in torsional vibration dampers that comprise two masses (primary mass and secondary mass) rotatably mounted with respect to one another, which are operatively connected to one another via at least one spring-damper unit. A jamming of the secondary mass can be present if the secondary mass can no longer be turned with respect to the primary mass. A slipping of the secondary centrifugal masses can be present, on the other hand, if the friction between the primary mass and the secondary mass is eliminated, for example, due to an air cushion, and the masses can move freely with respect to one another.

In order to reliably detect such or further fault conditions of the crankshaft drive, a further embodiment of the disclosure provides that the first center frequency $f_1$ is a frequency, at which resonance effects occur in the crankshaft drive if a fault condition of the crankshaft drive is present. The background is that, in the presence of a fault condition of the crankshaft drive, for example, a jamming of a secondary mass of a torsional vibration damper located in the crankshaft drive, the vibration behavior of the entire crankshaft drive usually changes and, as a result, resonance effects occur at different and/or additional frequencies as compared to the intact crankshaft drive. A resonance effect is to be understood to mean the occurrence of a vibration having a high amplitude at a certain frequency. Due to the targeted monitoring of the signal amplitude at a first center frequency $f_1$, which exactly corresponds to a resonance frequency of a fault condition, the occurrence of this fault condition can therefore be monitored in a highly sensitive manner. Since, consequently, only the frequency range that is relevant for the presence of the fault condition is taken into account, the data volume to be processed is advantageously reduced.

In order to establish the first center frequency $f_1$ of the bandpass filter, which is, for example, a frequency at which resonance effects occur in the crankshaft drive if a fault condition of the crankshaft drive is present, the method can include, moreover, the following steps:

Simulating or measuring the resonance behavior of an intact crankshaft drive for multiple excitation frequencies. An excitation can be understood to mean, in this case, a vibration of a certain frequency, which is applied externally onto the component. In order to measure the resonance behavior, the intact crankshaft drive, which, in particular, is mounted in the vehicle, can be excited to vibrate with the aid of an impact or vibration exciter or any other white noise, and the system response dependent on the geometry and material of the components, i.e., the resonance behavior, can be detected in the form of one or multiple characteristic vibration modes. Alternatively, the resonance behavior can also be determined with the aid of finite element methods. The resonance behavior may be determined for multiple frequencies, which can also occur and/or be detected during the operation of the crankshaft drive. Moreover, a simulation or measurement of the resonance behavior of the crankshaft drive with the appropriate fault condition also takes place for multiple excitation frequencies, for at least one fault condition of the crankshaft drive. In this case as well, the resonance behavior may be determined for multiple frequencies, which can also occur and/or be detected during the operation of the crankshaft drive. Thereafter, an excitation frequency is ascertained, at which the resonance behavior of the intact crankshaft drive and of the crankshaft drive with a fault condition differ, which can take place, for example, by comparing the appropriate vibration amplitudes. Based on the ascertained excitation frequency, the first passband range $D_1$ of the bandpass filter comprising the first center frequency $f_1$ is established. The advantage is that, in this way, the specific geometry and material composition of the crankshaft drive is taken into account in the establishment of the first center frequency $f_1$, which, overall, increases the accuracy and reliability of the method.

According to a further embodiment, the current rotational speed signal $N_{akt}$ is detected as a function of the torque and/or the rotational speed of the crankshaft. This can take place, for example, for certain discrete torque values and/or rotational speed values. The detection of the current rotational speed signal $N_{akt}$ of the sensor unit can also take place, however, for a certain torque range or multiple torque ranges and/or a certain rotational speed range or multiple rotational speed ranges. In particular in a rotational speed range from 0 rpm up to at most 10000 rpm. Moreover, the reference signal of the sensor unit stored in the memory is therefore also stored as a function of the torque and/or the rotational speed of the crankshaft. The comparison now takes place in that a rotational speed signal value of the filtered current rotational speed signal $N_{akt}$, which is detected at a certain torque and/or a certain rotational speed of the crankshaft, is compared to a reference signal value of the corresponding rotational speed. The advantage of this torque- and/or rotational speed-dependent evaluation of the rotational speed signal is that the reliability and accuracy of the method are increased, since changes in the resonance behavior induced by possible fault conditions become noticeable to varying degrees at different rotational speeds and/or torques.

In an embodiment, the filtered current rotational speed signal $N_{akt}$ is differentiated or integrated before the step of comparing, wherein the differentiation and integration can take place numerically or in an analog manner. Thereafter, the comparison and detection take place based on the differentiated or integrated filtered current rotational speed signal $N_{akt}$. In other words, the method therefore includes, among other things, the steps: Differentiating or integrating the filtered current rotational speed signal $N_{akt}$, comparing the differentiated or integrated filtered current rotational speed signal $N_{akt}$ with a reference signal $N_{ref}$ stored in a memory, and detecting a change in the operating behavior of the crankshaft drive based on the comparison of the differentiated or integrated filtered current rotational speed signal $N_{akt}$ with the reference signal $N_{ref}$. Instead of the rotational speed signal N, the angular velocity signal $\omega$ can therefore also be used once again. The differentiated rotational speed signal N or differentiated angular velocity signal $\omega$ is also referred to in the following as a rotational value acceleration signal a or an angular acceleration signal $\alpha$. The integrated rotational speed signal N or integrated angular velocity signal $\omega$ is also referred to in the following as the rotational speed angle signal f or angle signal $\varphi$. The advantage of differentiating the filtered detected signal is that, in this way, it is not the stationary signal component, but rather the dynamic signal component that is taken into account, which contains more precise information regarding possible deflections or load distributions in the crankshaft drive. Due to the integration of the filtered detected signal, on the other hand, the signal can be amplified and smoothed, which increases the reliability of the method. Moreover, an appropriate adaptation of the reference signal $N_{ref}$ is to also accompany the differentiation or integration of the filtered current rotational speed signal $N_{akt}$. In other words, the signal values of the reference signal $N_{ref}$ can vary depending on whether a filtered current rotational speed signal $N_{akt}$ or an additionally differentiated or integrated filtered current rotational speed signal $N_{akt}$ is utilized for the comparison.

Moreover, a further embodiment of the disclosure provides that the bandpass filter comprises at least one first passband range $D_1$ and one second passband range $D_2$, which may be disjoint from the first passband range $D_1$, which include different center frequencies $f_1$ and $f_2$, respectively. For example, the bandpass filter can include a first passband range $D_1$=140 Hz to 155 Hz with a center frequency of 147 Hz and a second passband range $D_2$=160 Hz to 185 Hz with a center frequency of 172 Hz. Disjoint is to mean, in this context, that the two passband ranges do not have a common frequency. The first and the second passband ranges may be narrow-band passband ranges, in particular with a bandwidth of 15 Hz. Alternatively, these can also be wide-band passband ranges, however. In addition, the embodiment is not limited to the utilization of only two passband ranges; any number of further passband ranges $D_n$ with center frequencies $f_n$ can also be utilized. The advantage of multiple, possibly disjoint, passband ranges is that—as explained more precisely in the following—not only the basic detection of a fault condition, but also the exact identification of the type of the fault condition is therefore made possible, in particular the distinction between two different possible fault conditions.

According to a further refinement, the method additionally includes the step of identifying a fault condition of the crankshaft drive, such as a jamming and/or a slipping of a secondary mass of a torsional vibration damper located in the crankshaft drive, based on the comparison of the filtered current rotational speed signal $N_{akt}$ with the reference signal $N_{ref}$ on the basis of signal values at the different center frequencies $f_1$ and $f_2$. Once again, the method is not limited to only two center frequencies and/or passband ranges; rather, any number of further center frequencies and/or passband ranges can be taken into account. In addition, instead of the filtered current rotational speed signal $N_{akt}$, the differentiated or integrated filtered current rotational speed signal $N_{akt}$ can also be utilized once again. The expression "identifying a fault condition" can be understood, in this context, to mean determining the precise type of the fault condition, for example, whether the fault condition is a crack in the crankshaft drive, bearing damage, wear of the vibration damper, etc. Since each fault condition modifies the geometry and/or the coupling of the individual crankshaft drive components with respect to one another, the resonance behavior of the overall system therefore also changes in a way that is characteristic for the particular fault condition. On the basis of the signal values at the different center frequencies $f_1$ and $f_2$, i.e., in other words, with the resultant signal pattern, the precise type of the fault condition can therefore be identified on the basis of the knowledge of the characteristic signal values and/or of the characteristic signal pattern of the individual fault conditions at the different center frequencies.

A further development of this embodiment provides that the second center frequency $f_2$ is greater than the first center frequency $f_1$ and that a jamming of a secondary mass of a torsional vibration damper located in the crankshaft drive can be identified based on an increased signal value at the first center frequency $f_1$ and/or a slipping of a secondary mass of a torsional vibration damper located in the crankshaft drive can be identified based on an increased signal value at the second center frequency $f_2$. For example, a first center frequency of $f_1$=147 Hz and a second center frequency of $f_2$=175 Hz can be selected for this purpose. In addition to the basic detection of a fault condition, it can therefore also be determined, on the basis of the characteristic signal pattern of the two fault conditions, whether there is a slipping and/or jamming of a secondary mass of a torsional vibration damper located in the crankshaft drive.

According to a further embodiment, the first center frequency $f_1$ of the bandpass filter is situated in the range between 0 Hz and 400 Hz and/or the bandpass filter has a bandwidth between 1 Hz and 20 Hz. The selection of the first center frequency $f_1$ in this frequency range is advantageous since resonance effects usually occur there under typical operating conditions.

According to an embodiment of the disclosure, the reference signal $N_{ref}$ is a signal that was determined in a reference state of the crankshaft drive. The reference state can be a state characterized by a certain operating state of the crankshaft drive, which is characterized by the vibration behavior and/or position behavior and/or resonance behavior of the crankshaft drive depending on the installation position and the rotational speed. The reference state can be a new state of the crankshaft drive shortly after the installation of the crankshaft drive, such as after the installation of the sensor unit and of the pulse generator in the motor vehicle. This has the advantage that the crankshaft drive has no wear and tear in this state and, therefore, wear-related changes can be easily detected during operation. The wording "shortly after the installation of the crankshaft drive" is to be understood to mean that no further production-related changes are carried out at the installation position of the crankshaft drive, in particular at the position of the sensor unit and pulse generator; a start-up of the vehicle has not yet taken place, however. "Shortly after the installation of the crankshaft drive" can encompass a period of time up to a mileage of the vehicle of 50 km.

Alternatively, the reference state is a state of the crankshaft drive shortly after a maintenance or repair of the crankshaft drive. Since the modifications at the crankshaft drive possibly carried out during the maintenance or repair can result in changes at the sensor unit and/or the pulse generator, it is advantageous to carry out a recalibration of the reference state, in order to avoid misdiagnoses or error messages. For example, the current rotational speed signal, angular velocity signal, rotational speed acceleration signal, angular acceleration signal, rotational speed angle signal, and/or angle signal of the sensor unit can be detected depending on the rotational speed, for this purpose, after the maintenance or repair of the crankshaft drive and stored in the memory as a new reference signal. In this case as well, the wording "shortly after a maintenance or repair of the crankshaft drive" is to be understood to mean that no further maintenance- or repair-related changes are carried out at the installation position of the crankshaft drive, in particular at the position of the sensor unit and pulse generator; a re-start of the vehicle has not yet taken place, however.

Alternatively, the reference state can also be a fault condition of the crankshaft drive, such as a jamming and/or a slipping of a secondary mass in a torsional vibration damper in the crankshaft drive. This has the advantage that, if different fault conditions—also referred to wear conditions—result in a rotational speed-dependent vibration behavior, position behavior, and resonance behavior of the crankshaft drive, which are characteristic for the particular fault condition or wear state, these fault conditions can also be utilized as reference states, in order to carry out a targeted misdiagnosis. In addition, multiple reference states of the crankshaft drive can also be stored in the memory and the comparison can therefore be carried out for the multiple stored reference states.

According to a further embodiment of the disclosure, the comparison of the filtered current rotational speed signal $N_{akt}$ of the sensor unit with the reference signal $N_{ref}$ stored in the memory takes place by forming an absolute difference of the two signals $\Delta N=|N_{akt}-N_{ref}|$. If the filtered current rotational speed signal $N_{akt}$ is additionally differentiated or integrated, the same also applies for the differentiated or integrated filtered current rotational speed signal $N_{akt}$. Moreover, in the step of forming the absolute difference, in order to improve the signal quality, $N_{akt}$ can be time-averaged, an effective value and/or a positive maximum signal amplitude of $N_{akt}$ can be determined. If the absolute difference of the two signals $\Delta N$ exceeds and/or falls below a threshold value SW, a message is output. The threshold value can be fixedly predefined or variable. For example, the first threshold value can be predefined by the manufacturer for a certain combination of sensor unit and pulse generator and/or for a certain type of crankshaft. An advantage of the method is that the formation of the absolute difference of the signals and the subsequent comparison are easily implemented with respect to software as well as hardware. The output message can include a visual and/or acoustic signal. The message can also continue with respect to time until the change in the operating behavior of the crankshaft drive has been rectified, or can occur at regular, temporally limited intervals. The message can also take place in electronic form, for example, as a digital entry in a fault memory of the motor vehicle.

Moreover, an embodiment of the disclosure provides that the method is carried out at regular time intervals and/or at certain kilometer readings of the motor vehicle, and the ascertained current rotational speed signals $N_{akt}$ of the sensor unit are stored, as trend data, in a memory and are output to a user, possibly upon request. In this case as well, the storage is not limited to the current rotational speed signals $N_{akt}$ of the sensor unit; rather, current angular velocity signals, rotational speed acceleration signals, angular acceleration signals, rotational speed angle signals, and/or angle signals of the sensor unit can also be stored in the memory as trend data. Trend data are understood to mean data that were ascertained using the same measuring process and were subsequently subjected to the same method steps, but which were gathered at different points in time. This allows for a direct comparison of the data, in order to easily detect systematic effects, for example, a continuous wear of the crankshaft drive. It can therefore be ascertained from these trend data whether a fault condition of the crankshaft drive is a sudden and, therefore, unexpected damage or an operation-related and, therefore, foreseeable wear of the crankshaft drive. The time intervals can be uniform and, therefore, periodic, or can follow a certain order, although without a fixed periodicity. For example, the time interval can be half a year. The execution of the method can also take place at certain kilometer readings at fixed intervals, for example, once every 5000 km, or according to a certain order, although without a fixed periodicity. For example, the kilometer reading at which the method is carried out again can be reduced as the kilometer reading of the vehicle increases, in order to more reliably detect a fault condition that is becoming more likely due to the high mileage. The trend data can be output visually and/or acoustically to the user. Moreover, the trend data can be made available to the user in electronic form, in particular digital data.

For greater clarity, an order of the individual method steps was indirectly implied in all previous embodiments via the wording (for example, the expression "differentiation of the filtered current rotational speed signal" implies that the differentiation takes place after the filtering). It is immediately obvious to a person skilled in the art, however, that the method steps can be partially interchanged (for example, filtering a differentiated signal) or combined (for example, direct detection of an angular acceleration), without deviating from the concept of the disclosure. In order to represent such orders of the method steps, within the same sense, that achieve the same inventive idea, an alternative is described in the following as a further general aspect of the disclosure. It is apparent once again for a person skilled in the art that the previous embodiments can therefore also be similarly transferred onto the method presented here.

According to a second general aspect of the disclosure, a method is provided for detecting a change in the operating behavior of a crankshaft drive of a motor vehicle, such as a commercial vehicle. The crankshaft drive comprises a crankshaft, a pulse generator rotating during the operation of the crankshaft, and a fixed sensor unit, which generates a rotational speed signal N depending on the rotational speed of the pulse generator. Moreover, the method includes the following steps:

During the operation of the crankshaft drive, a current rotational speed signal $N_{akt}$ of the sensor unit is detected, for example, at a high scanning rate. This current rotational speed signal $N_{akt}$ is subsequently differentiated or integrated. The differentiated or integrated current rotational speed signal $N_{akt}$ is filtered with the aid of a bandpass filter, which has at least one first passband range $D_1$ comprising a first center frequency $f_1$. The filtered differentiated or integrated current rotational speed signal $N_{akt}$ is then compared to a reference signal $N_{ref}$ stored in a memory. Based on the comparison of the filtered differentiated or integrated current rotational speed signal $N_{akt}$ with the reference signal $N_{ref}$, a change in the operating behavior of the crankshaft drive is detected.

Moreover, the disclosure relates to a motor vehicle, in particular a commercial vehicle, comprising a crankshaft drive, including a crankshaft, a pulse generator rotating during operation of the crankshaft, and a fixed inductive sensor unit, which generates a rotational speed signal N dependent on the rotational speed of the pulse generator, and a control unit, which is configured for receiving the rotational speed signals of the sensor unit and carrying out a method for detecting a change in the operating behavior of a crankshaft drive, as described in this document.

BRIEF DESCRIPTION OF THE DRAWINGS

Further details and advantages of the disclosure are described in the following with reference to the attached drawing, wherein.

DETAILED DESCRIPTION

Figure 1:
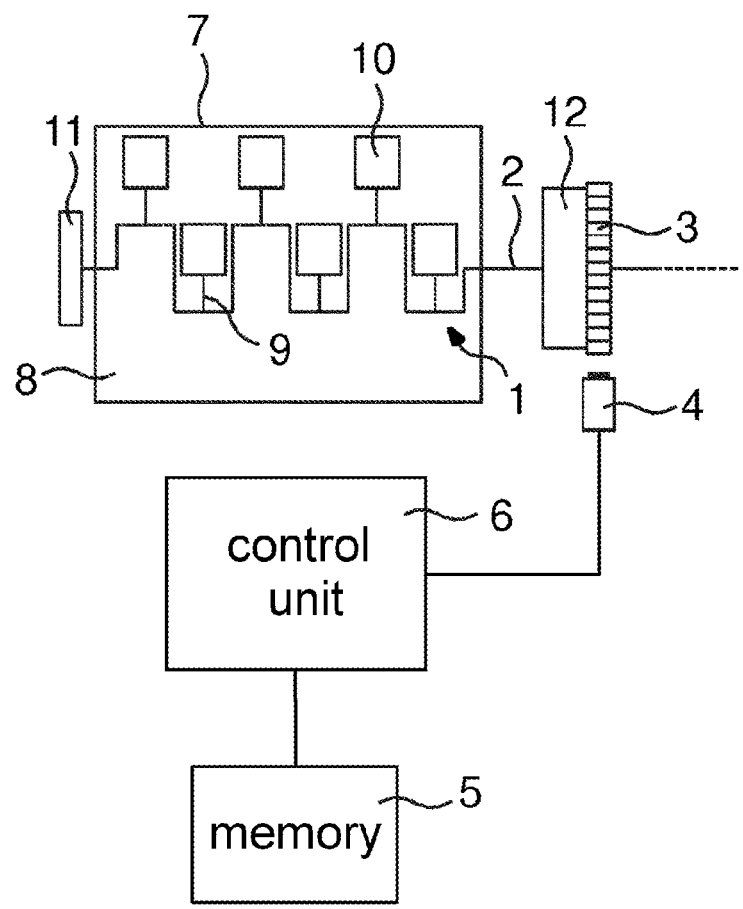
FIG. 1 shows a schematic representation of a crankshaft drive comprising a pulse generator and a sensor unit.

FIG. 1 schematically shows a crankshaft drive 1, which is known per se, of a motor vehicle, in particular of a commercial vehicle. The crankshaft drive 1 comprises a crankshaft 2, which is part of an internal combustion engine 8 schematically represented only as an engine block 7, and multiple connecting rods 9 and pistons 10 coupled to the crankshaft 2. Moreover, the crankshaft drive 1 as well as the internal combustion engine 8 comprise further components, which are utilized according to the usual practical application, in particular counterweights, crankshaft bearings, seals, cylinders, injection systems, etc., without these being explicitly represented in FIG. 1. The crankshaft 2 is arranged within the engine block 7 and is guided out of both sides. A torsional vibration damper 11 is provided at an end of the crankshaft 2 guided out of the engine block 7. At an end of the crankshaft 2 positioned opposite this end, the crankshaft drive 1 comprises a flywheel 12, for example, a dual-mass flywheel, comprising a pulse generator 3 designed as a transmitter wheel. The transmitter wheel comprises equidistant angle markings on the circumferential side, which can be designed as holes or projections. A sensor unit 4, for example, an inductive sensor unit, which is suitable for generating a rotational speed signal N or an angular velocity signal ω dependent on the rotational speed or the angular velocity of the pulse generator 3 is provided adjacent to the transmitter wheel—radially in the present embodiment, wherein an axial installation position would also be possible. For this purpose, there is a fixed relationship between the spacing of the angle markings on the transmitter wheel and the corresponding revolution of the crankshaft, whereby the rotational speed or the angular velocity of the crankshaft 2 can be ascertained from the detection of the angle markings per unit of time. In the embodiment represented in FIG. 1, the rotational speed signal N or the angular velocity signal ω detected by the sensor unit 4 is made available to a control unit 6. Moreover, the control unit 6 is connected to a memory 5, on which at least one reference signal $N_{ref}$ or $\omega_{ref}$ of the sensor unit 4 is stored.

Figure 2:
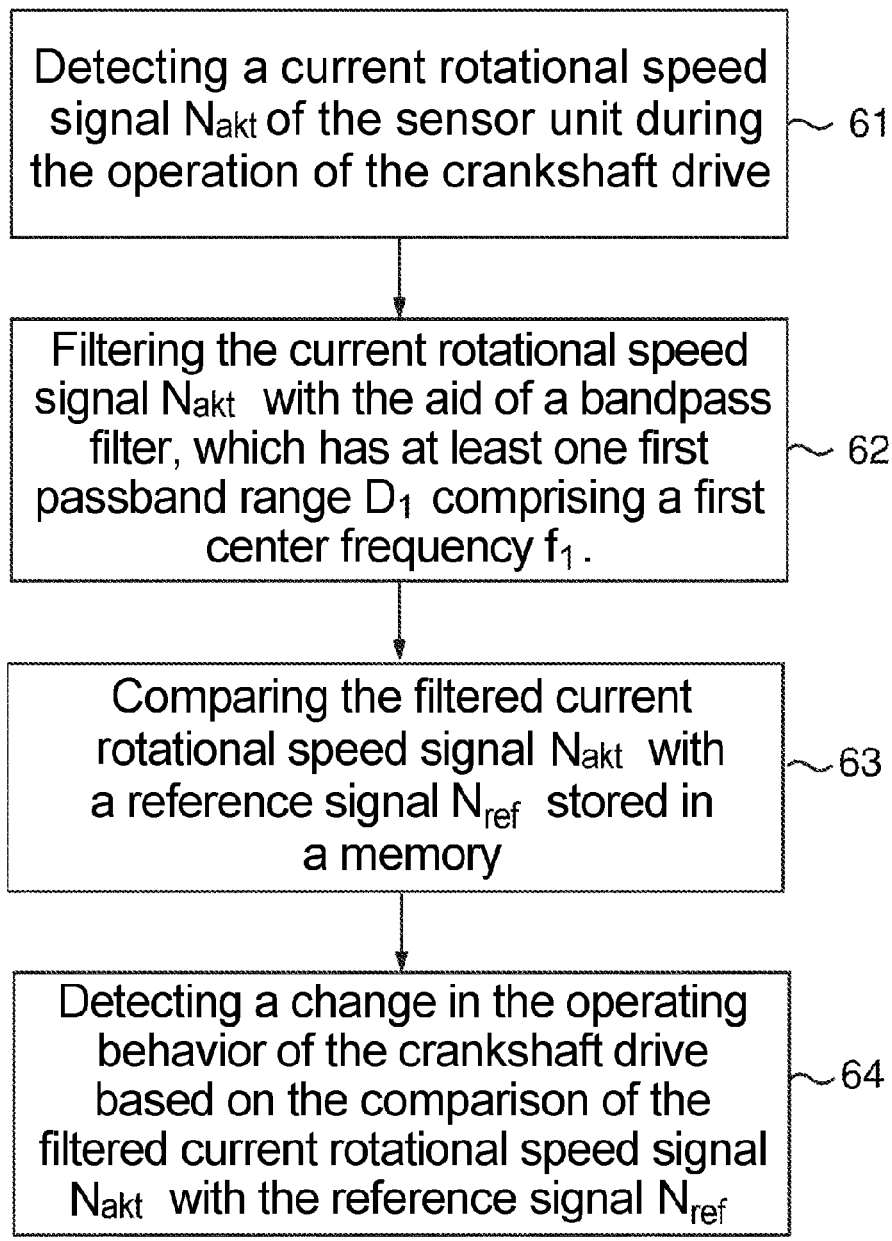
FIG. 2 shows a method for detecting a change in the operating behavior of a crankshaft drive of a motor vehicle according to an embodiment of the disclosure.

FIG. 2 shows a flowchart of a method for detecting a change in the operating behavior of a crankshaft drive 1 of a motor vehicle according to an embodiment of the disclosure. In step 61, a current rotational speed signal $N_{akt}$ of the sensor unit 4 is detected during an, in particular stationary, operation of the crankshaft drive 1. The current rotational speed signal $N_{akt}$ essentially indicates the revolutions of the pulse generator 3 per unit of time, although further oscillations of the rotational speed (harmonics) are usually always also superimposed on this actual rotational speed signal. Since the frequencies of these further oscillation modes are dependent, among other things, on the present state of the crankshaft drive 1, the presence of possible fault conditions in the crankshaft drive 1 can be inferred from the presence of certain oscillation modes in the current rotational speed signal $N_{akt}$. For this reason, in step 62, the current rotational speed signal $N_{akt}$ of the sensor unit 4 is filtered with the aid of a bandpass filter, which has at least one first passband range $D_1$ comprising a first center frequency $f_1$. The first passband range may be a narrow-band passband range, in particular with a bandwidth of approximately 15 Hz. In step 63, the filtered current rotational speed signal $N_{akt}$ of the sensor unit 4 is then compared to a reference signal $N_{ref}$ of the sensor unit 4 stored in a memory 5. In order to compare the signals, the filtered current rotational speed signal $N_{akt}$ can additionally be time-averaged. In step 64, a detection of changes in the operating behavior of the crankshaft drive 1 then takes place based on the comparison of the filtered current rotational speed signal $N_{akt}$ with the reference signal $N_{ref}$. If a change was detected, this can be communicated to a user of the motor vehicle via visual and/or acoustic signals and/or a message in the fault memory of the vehicle.

Figure 3:
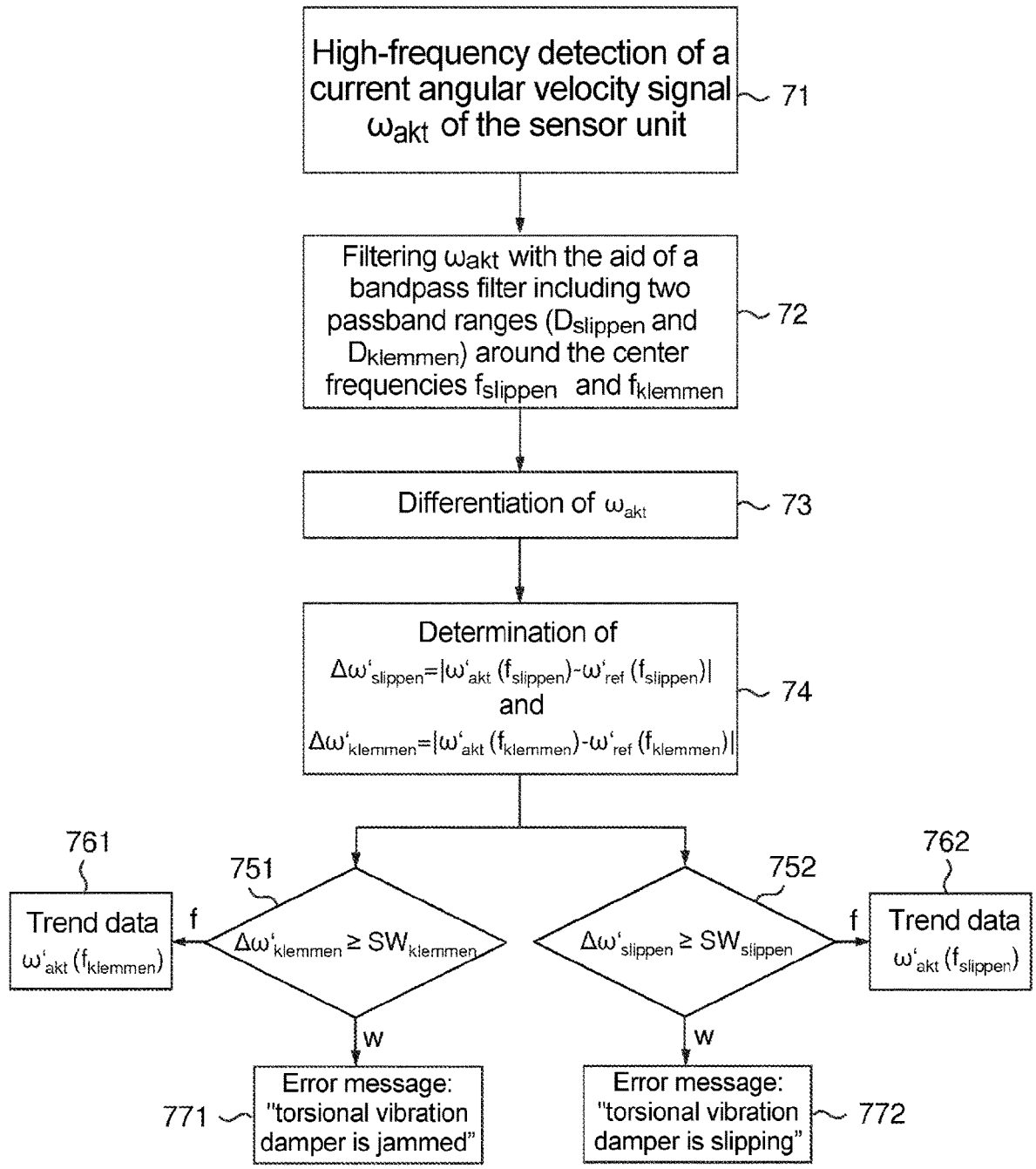
FIG. 3 shows a method for detecting a change in the operating behavior of a crankshaft drive of a motor vehicle according to a further embodiment of the disclosure.

FIG. 3 shows a flowchart of a method for detecting a change in the operating behavior of a crankshaft drive 1 of a motor vehicle according to a further embodiment of the disclosure. The starting point is the high-frequency detection of a current angular velocity signal $\omega_{akt}$ of the sensor unit 4 in step 71. This can take place in a stationary mode of the crankshaft drive 1 at a fixed rotational speed or in a manner dependent on rotational speed and/or torque. In order to detect not only the basic presence of a fault condition of the crankshaft drive 1, but also, for example, to detect its precise type of the fault condition, in step 72, the current angular velocity signal $\omega_{akt}$ is filtered with the aid of a bandpass filter, which includes a first passband range $D_{slippen}$ comprising a first center frequency $f_{slippen}$, and a second passband range $D_{klemmen}$ comprising a second center frequency $f_{klemmen}$. The two center frequencies were selected in such a way that, in the case of a slipping of a secondary mass of a torsional vibration damper 11 located in the crankshaft drive 1, an increased signal value occurs at the first center frequency $f_{slippen}$, and, in the case of a jamming of the secondary mass of the torsional vibration damper 11 located in the crankshaft drive 1, an increased signal value occurs at the second center frequency $f_{klemmen}$. In step 73, the filtered current angular velocity signal $\omega_{akt}$ is subsequently differentiated, in order to detect dynamic changes of the crankshaft drive 1 in a more sensitive manner. The resultant differentiated filtered current angular velocity signal $\omega_{akt}$ is referred to in the following as the current angular acceleration signal $\omega'_{akt}$. In step 74, subsequently, the absolute difference is formed from the current angular acceleration signal $\omega'_{akt}$ and the corresponding reference signal $\omega'_{ref}$ stored in the memory 5, wherein the signal components of the two passband ranges $D_{slippen}$ and $D_{klemmen}$ are considered separately. Specifically, for this purpose, on the one hand, the absolute difference $\Delta\omega'_{slippen}$ for the signal component is calculated in the range of the first center frequency $f_{slippen}$, i.e., $\Delta\omega'_{slippen}=|\omega'_{akt}(f_{slippen})-\omega'_{ref}(f_{slippen})|$, on the other hand, the absolute difference $\Delta\omega'_{klemmen}$ for the signal component is calculated in the range of the second center frequency $f_{klemmen}$, i.e., $\Delta\omega'_{klemmen}=|\omega'_{akt}(f_{klemmen})-\omega'_{ref}(f_{klemmen})|$. Depending on the value of these two variables $\Delta\omega'_{slippen}$ and $\Delta\omega'_{klemmen}$, different operations are subsequently carried out:

If it is established in step 751 that $\Delta\omega'_{klemmen}$ is below a first threshold value $SW_{klemmen}$, there is no jamming of the secondary mass of the torsional vibration damper 11 located in the crankshaft drive 1, and/or possible changes in the operating behavior of the crankshaft drive 1 with respect to a reference state—in this case, the new state of the crankshaft drive 1—are situated within the tolerance range ($SW_{klemmen}$). The current angular acceleration signal value in the range of the second center frequency $\omega'_{akt}(f_{klemmen})$ is subsequently stored in the memory 5 as a data point for a trend data analysis (step 761) and can be output to a user upon request. If it is established in step 751, on the other hand, that $\Delta\omega'_{klemmen}$ exceeds the first threshold value $SW_{klemmen}$, there is a jamming of the secondary mass of the torsional vibration damper 11 located in the crankshaft drive 1. Whereupon, in step 771, a message is output to the user that "the torsional vibration damper is jammed".

In parallel, it is established in step 752 whether $\Delta\omega'_{slippen}$ is below or above a second threshold value $SW_{slippen}$. In this case as well, a certain tolerance range is defined via the threshold value $SW_{slippen}$, in which the behavior of the secondary mass of the torsional vibration damper 11 is permitted to deviate from its setpoint behavior. Therefore, if $\Delta\omega'_{slippen}<SW_{slippen}$, there is no slipping of the secondary mass of the torsional vibration damper 11. Subsequently, the current angular acceleration signal value in the range of the first center frequency $\omega'_{akt}(f_{slippen})$ is stored in the memory 5 as a data point for a trend data analysis (step 762) and can be output to a user upon request. If it is established in step 752, on the other hand, that $\Delta\omega'_{slippen}$ exceeds the second threshold value $SW_{slippen}$, there is a slipping of the secondary mass of the torsional vibration damper 11 located in the crankshaft drive 1. Whereupon, in step 772, a message is output to the user that "the torsional vibration damper is slipping". Due to the utilization of a bandpass filter including two passband ranges and the aforementioned decision rules, it is therefore possible not only to detect the basic presence of a fault condition of the crankshaft drive 1, but also to identify the precise type of the fault condition. Due to the utilization of further passband ranges or more complex decision rules, the aforementioned embodiment can also be expanded with further types of fault conditions.

Figure 4:
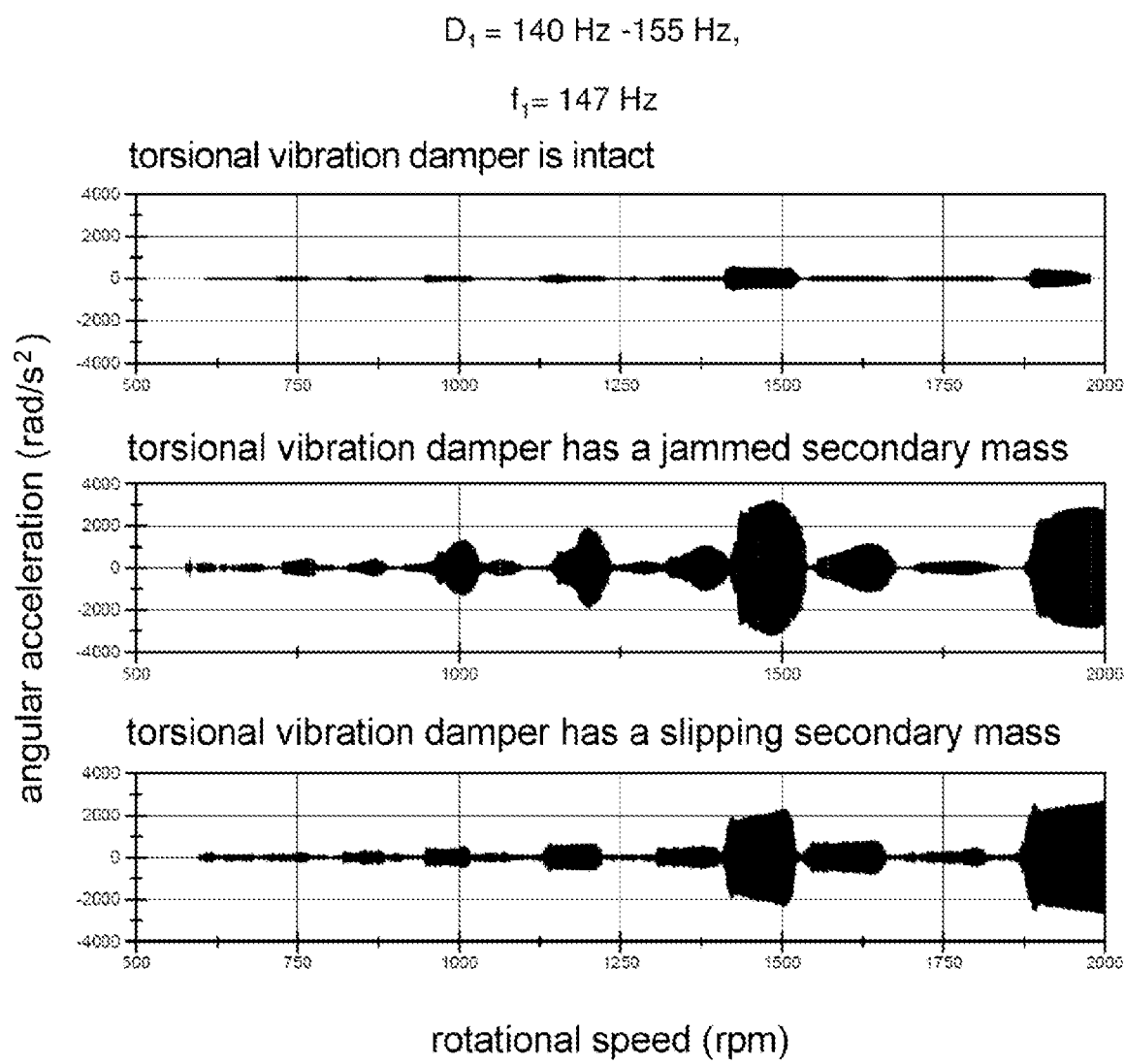
FIG. 4 shows an angular velocity signal (=angular acceleration signal), which has been bandpass-filtered around the center frequency $f_1$=147.5 Hz and differentiated, as a function of the rotational speed for different operating states of the crankshaft drive.

FIG. 4 shows, by way of example, a bandpass-filtered (first passband range $D_1$=140-155Hz, center frequency $f_1$=147 Hz) and differentiated angular velocity signal (=angular acceleration signal), which was measured as a function of the rotational speed for different operating states of the torsional vibration damper (TDS) 11 in the crankshaft drive 1. In the diagram at the top, the angular accelerations occurring for an intact torsional vibration damper 11 are represented. Hardly increased angular acceleration signal amplitudes occur in this case; slightly increased signal amplitudes due to resonance effects are apparent only in the rotational speed range around 1450 rpm and 1950 rpm. In the course of the claimed method, such a measurement could be stored in the memory 5, for example, as a reference signal $\alpha_{ref}$. The diagram in the center shows the rotational speed-dependent angular acceleration signal in the case of a crankshaft drive 1 including a torsional vibration damper 11, the secondary mass of which is jammed. In comparison with the intact torsional vibration damper 11, the signal amplitudes are now increased across the entire rotational speed range, wherein considerable resonance effects occur, for example, in the rotational speed range around 1000 rpm, 1500 rpm, and 2000 rpm. Regardless of whether a rotational speed-dependent comparison takes place or not, a fault condition of the crankshaft drive 1 can be reliably detected with the claimed method due to the signal amplitudes, which are increased overall as compared to the intact torsional vibration damper 11. The same also applies for the case of a torsional vibration damper 11 including a slipping secondary mass, which is represented in the lower diagram. In this case as well, increased angular acceleration signal amplitudes are present across the entire rotational speed range as compared to the intact case. Due to the different resonance behavior as compared to the case of the jammed secondary mass, a distinction can also be made between the two fault conditions (jamming, slipping), however, for example, on the basis of the signal amplitude at 1000 rpm. The possibility for making a distinction becomes even more apparent if another frequency range, represented in FIG. 5, is considered.

Figure 5:
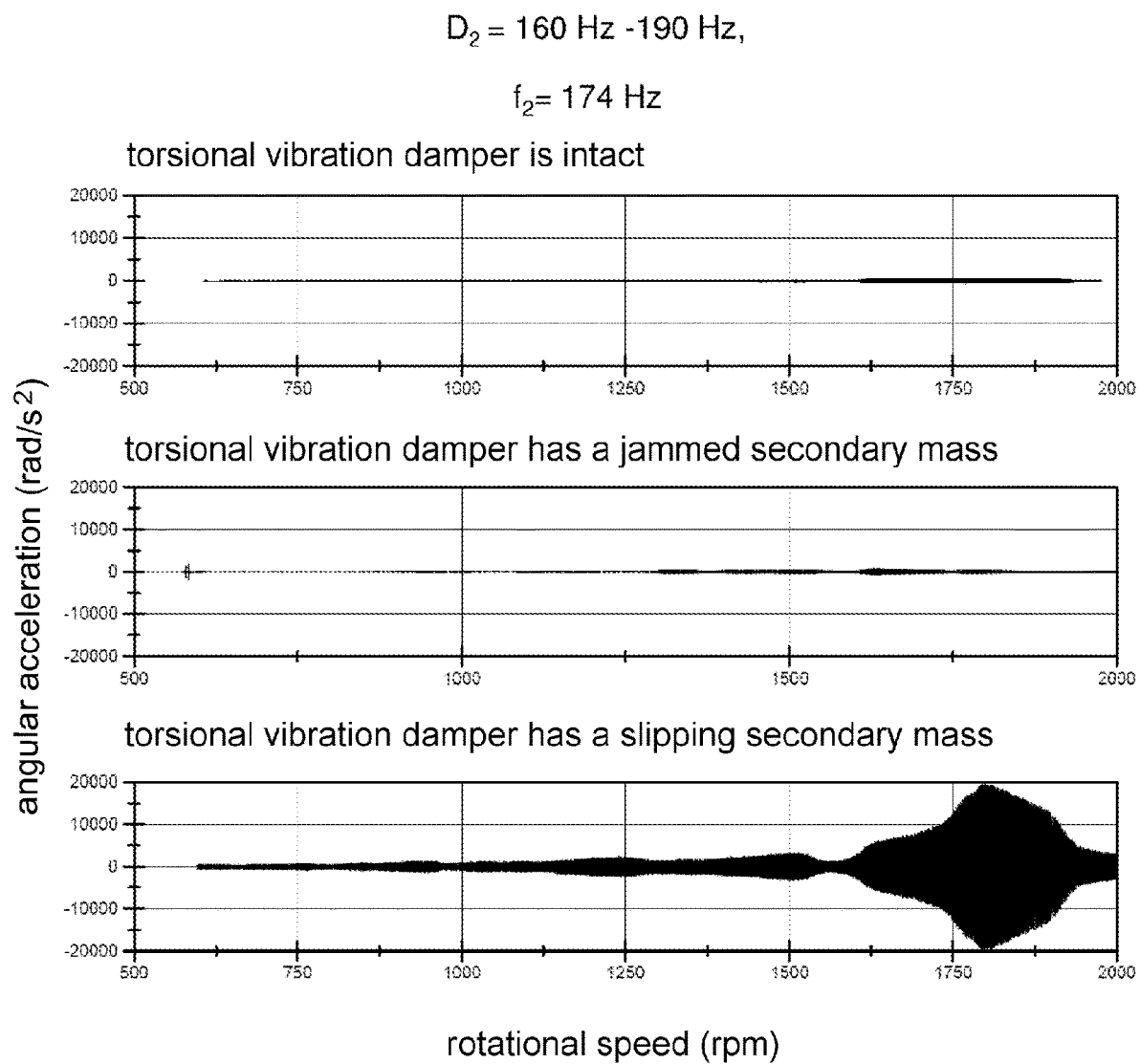
FIG. 5 shows an angular velocity signal (=angular acceleration signal), which has been bandpass-filtered around the center frequency $f_2$=175 Hz and differentiated, as a function of the rotational speed for the same operating states of the crankshaft drive as in FIG. 4.

FIG. 5 also shows a bandpass-filtered and differentiated angular velocity signal (=angular acceleration signal) as a function of the rotational speed for different operating states of the torsional vibration damper 11. However, in this case, the signals were filtered with the aid of the bandpass filter in a frequency range of $D_2$=160 Hz to 190 Hz (center frequency $f_2$=174 Hz). The uppermost diagram shows the angular accelerations occurring for an intact torsional vibration damper 11, wherein, similarly to the case in FIG. 4, hardly any increased signal amplitudes are apparent across the entire rotational speed range. The same also applies for the case of a torsional vibration damper 11, the secondary mass of which is jammed, represented in the diagram in the center. With respect to the passband range $D_2$=160 Hz to 190 Hz selected here, therefore, no greatly changed behavior of the angular acceleration signal is detectable, despite the presence of a fault condition, which is a jammed secondary mass in this case. Consequently, this frequency range alone, i.e., within the meaning of a first passband range, would be unsuitable for monitoring the state of the crankshaft drive 1, in order to detect the fault condition of the jamming of the secondary mass. In this frequency range, however, a jamming of the secondary mass can be clearly distinguished from a slipping of the secondary mass. As represented in the lower diagram in FIG. 5, in the presence of a slipping secondary mass, considerable resonances and, therefore, increased signal amplitudes occur, primarily in the rotational speed range around 1800 rpm. Due to these considerably different signal characteristics, the two fault conditions (jamming, slipping) in this frequency range of $D_2$=160 Hz to 190 Hz can be unambiguously distinguished, which is why this frequency range would be suitable, for example, as a second passband range of the bandpass filter.

Although exemplary embodiments have been described, it is apparent to a person skilled in the art that various changes can be carried out and equivalents can be utilized as a substitute, without departing from the scope of the disclosure. Consequently, the disclosure is not to be limited to the described exemplary embodiments, but rather is to encompass all exemplary embodiments that fall within the scope of protection.

LIST OF REFERENCE NUMBERS 1 crankshaft drive
2 crankshaft
3 pulse generator
4 sensor unit
5 memory
6 control unit
7 engine block
8 internal combustion engine
9 connecting rod
10 piston
11 torsional vibration damper
12 flywheel

What is claimed is:

1. A method for detecting a change in an operating behavior of a crankshaft drive of a motor vehicle, wherein the crankshaft drive includes a crankshaft, a pulse generator rotating during operation of the crankshaft, and a fixed sensor unit, which generates a rotational speed signal N dependent on a rotational speed of the pulse generator, the method comprising:
    detecting a current rotational speed signal $N_{akt}$ of the fixed sensor unit during the operation of the crankshaft drive;
    filtering the current rotational speed signal $N_{akt}$ with a bandpass filter, which has: (a) a first passband range $D_1$ including a first center frequency $f_1$ and (b) a second passband range $D_2$ including a second center frequency $f_2$ different from the first center frequency $f_1$;
    comparing the filtered current rotational speed signal $N_{akt}$ with a reference signal $N_{ref}$ stored in a memory; and
    detecting the change in the operating behavior of the crankshaft drive based on the comparison of the filtered current rotational speed signal $N_{akt}$ with the reference signal $N_{ref}$.

2. The method as claimed in claim 1, wherein detecting the change in the operating behavior of the crankshaft drive includes detecting a fault condition of a torsional vibration damper located in the crankshaft drive.

3. The method as claimed in claim 1, wherein the first center frequency $f_1$ is a frequency at which resonance effects occur in the crankshaft if a fault condition of the crankshaft drive is present.

4. The method as claimed in claim 1, wherein, in order to establish the first center frequency $f_1$ of the bandpass filter, the method further comprises:
    simulating or measuring resonance behavior of an intact crankshaft drive for multiple excitation frequencies;
    for at least one fault condition of the crankshaft drive, simulating or measuring the resonance behavior of the crankshaft drive with an appropriate fault condition for multiple excitation frequencies;
    ascertaining an excitation frequency at which the resonance behavior of the intact crankshaft drive and of the crankshaft drive with a fault condition differ; and
    establishing the first passband range $D_1$ of the bandpass filter comprising the first center frequency $f_1$ based on the ascertained excitation frequency.

5. The method as claimed in claim 1, wherein the current rotational speed signal $N_{akt}$ is detected as a function of the torque and/or the rotational speed of the crankshaft,
    wherein the reference signal $N_{ref}$ of the fixed sensor unit stored in the memory is stored as a function of the torque and/or the rotational speed of the crankshaft, and
    wherein a rotational speed signal value of the filtered current rotational speed signal $N_{akt}$, which is detected at a certain torque and/or a certain rotational speed of the crankshaft, is compared to a reference signal value of the corresponding torque and/or of the corresponding rotational speed of the crankshaft.

6. The method as claimed in claim 1, wherein, before the comparing, the filtered current rotational speed signal $N_{akt}$ is differentiated or integrated, and
    wherein the comparing and detecting are performed based on the differentiated or integrated filtered current rotational speed signal $N_{akt}$.

7. The method as claimed in claim 1, further comprising identifying a fault condition of the crankshaft drive based on the comparison of the filtered current rotational speed signal $N_{akt}$ with the reference signal $N_{ref}$ on the basis of signal values at the different first and second center frequencies $f_1$ and $f_2$.

8. The method as claimed in claim 7, wherein the second center frequency $f_2$ is greater than the first center frequency $f_1$,
    wherein the fault condition of the crankshaft drive is a jamming or a slipping of a secondary mass of a torsional vibration damper located in the crankshaft drive, and
    wherein the jamming of the secondary mass of the torsional vibration damper located in the crankshaft drive is identified based on an increased signal value at the first center frequency $f_1$, or the slipping of the secondary mass of the torsional vibration damper located in the crankshaft drive is identified based on an increased signal value at the second center frequency $f_2$.

9. The method as claimed in claim 1, wherein the first center frequency $f_1$ of the bandpass filter is within a range between 0 Hz and 400 Hz and/or the bandpass filter has a bandwidth between 1 Hz and 20 Hz.

10. The method as claimed in claim 1, wherein the reference signal $N_{ref}$ is a signal that is determined in a reference state of the crankshaft drive, and
wherein the reference state is:
(a) a new state of the crankshaft drive shortly after installation of the crankshaft drive, in the motor vehicle, or a state of the crankshaft drive shortly after maintenance or repair of the crankshaft drive, or
(b) a fault condition of the crankshaft drive.

11. The method as claimed in claim 1, wherein comparing the filtered current rotational speed signal $N_{akt}$ of the fixed sensor unit with the reference signal $N_{ref}$ stored in the memory includes forming an absolute difference of the two signals $\Delta N=|N_{akt}-N_{ref}|$ and outputting a message if the absolute difference of the two signals $\Delta N$ exceeds and/or falls below a threshold value SW.

12. The method as claimed in claim 1, wherein the method is carried out at regular time intervals and/or at certain kilometer readings of the motor vehicle, and the current rotational speed signal $N_{akt}$ of the fixed sensor unit are stored, as trend data, in the memory and are output to a user.

13. The method as claimed in claim 1, wherein the motor vehicle is a commercial vehicle.

14. The method as claimed in claim 2, wherein the fault condition of the torsional vibration damper is a jamming or a slipping of a secondary mass of the torsional vibration damper.

15. The method as claimed in claim 1, wherein the second passband range $D_2$ is disjoint from the first passband range $D_1$.

16. The method as claimed in claim 10, wherein the reference state is the new state of the crankshaft drive after installation of the fixed sensor unit and the pulse generator, or
wherein the fault condition of the crankshaft drive is a jamming and/or a slipping of a secondary mass in a torsional vibration damper in the crankshaft drive.

17. The method as claimed in claim 12, wherein the current rotational speed signal $N_{akt}$ of the fixed sensor unit are output to the user upon request.

18. A method for detecting a change in operating behavior of a crankshaft drive of a motor vehicle, wherein the crankshaft drive includes a crankshaft, a pulse generator rotating during operation of the crankshaft, and a fixed sensor unit, which generates a rotational speed signal N dependent on a rotational speed of the pulse generator, the method comprising:
detecting a current rotational speed signal $N_{akt}$ of the fixed sensor unit during the operation of the crankshaft drive;
differentiating or integrating the current rotational speed signal $N_{akt}$;
filtering the differentiated or integrated current rotational speed signal $N_{akt}$ with a bandpass filter, which has a first passband range $D_1$ comprising a first center frequency $f_1$;
comparing the filtered differentiated or integrated current rotational speed signal $N_{akt}$ with a reference signal $N_{ref}$ stored in a memory; and
detecting the change in an operating behavior of the crankshaft drive based on the comparison of the filtered differentiated or integrated current rotational speed signal $N_{akt}$ with the reference signal $N_{ref}$.

19. A motor vehicle comprising a crankshaft drive, the crankshaft drive including:
a crankshaft;
a pulse generator rotating during operation of the crankshaft;
a fixed sensor unit, which generates a rotational speed signal N depending on a rotational speed of the pulse generator; and
a control unit, which is configured to:
receive the rotational speed signal N of the fixed sensor unit;
filter the rotational speed signal N with a bandpass filter, which has: (a) a first passband range $D_1$ including a first center frequency $f_1$ and (b) a second passband range $D_2$ including a second center frequency $f_2$ different from the first center frequency $f_1$;
compare the filtered rotational speed signal N with a reference signal stored in a memory; and
detect a change in operating behavior of the crankshaft drive based on the comparison of the filtered rotational speed signal N with the reference signal.

20. A method for detecting a change in an operating behavior of a crankshaft drive of a motor vehicle, wherein the crankshaft drive includes a crankshaft, a pulse generator rotating during operation of the crankshaft, and a fixed sensor unit, which generates a rotational speed signal N dependent on a rotational speed of the pulse generator, the method comprising:
detecting a current rotational speed signal $N_{akt}$ of the fixed sensor unit during the operation of the crankshaft drive;
filtering the current rotational speed signal $N_{akt}$ with a bandpass filter, which has a first passband range $D_1$ comprising a first center frequency $f_1$;
comparing the filtered current rotational speed signal $N_{akt}$ with a reference signal $N_{ref}$ stored in a memory; and
detecting the change in the operating behavior of the crankshaft drive based on the comparison of the filtered current rotational speed signal $N_{akt}$ with the reference signal $N_{ref}$;
wherein the first center frequency $f_1$ is a frequency at which resonance effects occur in the crankshaft if a fault condition of the crankshaft drive is present.

21. A method for detecting a change in an operating behavior of a crankshaft drive of a motor vehicle, wherein the crankshaft drive includes a crankshaft, a pulse generator rotating during operation of the crankshaft, and a fixed sensor unit, which generates a rotational speed signal N dependent on a rotational speed of the pulse generator, the method comprising:
detecting a current rotational speed signal $N_{akt}$ of the fixed sensor unit during the operation of the crankshaft drive;
filtering the current rotational speed signal $N_{akt}$ with a bandpass filter, which has a first passband range $D_1$ comprising a first center frequency $f_1$;
comparing the filtered current rotational speed signal $N_{akt}$ with a reference signal $N_{ref}$ stored in a memory; and
detecting the change in the operating behavior of the crankshaft drive based on the comparison of the filtered current rotational speed signal $N_{akt}$ with the reference signal $N_{ref}$;
wherein the first center frequency $f_1$ of the bandpass filter is within a range between 0 Hz and 400 Hz and/or the bandpass filter has a bandwidth between 1 Hz and 20 Hz.

* * * * *